(12) United States Patent
Ding et al.

(10) Patent No.: US 9,875,443 B2
(45) Date of Patent: Jan. 23, 2018

(54) UNIFIED ATTRACTIVENESS PREDICTION FRAMEWORK BASED ON CONTENT IMPACT FACTOR

(71) Applicant: TCL RESEARCH AMERICA INC., San Jose, CA (US)

(72) Inventors: Wanying Ding, San Jose, CA (US); Lifan Guo, San Jose, CA (US); Yue Shang, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 406 days.

(21) Appl. No.: 14/743,141

(22) Filed: Jun. 18, 2015

(65) Prior Publication Data
US 2016/0371598 A1 Dec. 22, 2016

(51) Int. Cl.
| | |
|---|---|
| *G06F 9/44* | (2006.01) |
| *G06N 7/02* | (2006.01) |
| *G06N 7/06* | (2006.01) |
| *G06N 7/00* | (2006.01) |
| *G06F 17/30* | (2006.01) |
| *G11B 27/00* | (2006.01) |
| *H04N 21/80* | (2011.01) |

(52) U.S. Cl.
CPC ............ *G06N 7/005* (2013.01); *G06F 17/30* (2013.01); *G11B 27/00* (2013.01); *H04N 21/80* (2013.01)

(58) Field of Classification Search
USPC .......................................................... 706/52
See application file for complete search history.

(56) References Cited

U.S. PATENT DOCUMENTS

| | | | | |
|---|---|---|---|---|
| 7,876,819 B2* | 1/2011 | Wang | ................... | H04N 19/147 375/240.01 |
| 8,036,263 B2* | 10/2011 | Wang | ................ | G06F 17/30802 348/218.1 |
| 8,209,623 B2* | 6/2012 | Barletta | .............. | G06F 3/04883 715/776 |

(Continued)

OTHER PUBLICATIONS

Image Interpolation via Graph-Based Bayesian Label Propagation Xianming Liu; Debin Zhao; Jiantao Zhou; Wen Gao; Huifang Sun IEEE Transactions on Image Processing Year: 2014, vol. 23, Issue: 3 pp. 1084-1096 IEEE Journals & Magazines.*

(Continued)

*Primary Examiner* — Michael B Holmes
(74) *Attorney, Agent, or Firm* — Anova Law Group, PLLC

(57) ABSTRACT

A unified attractiveness prediction method is provided. The method includes receiving a plurality of videos and extracting at least one of metadata and view data from each of the plurality of received videos, wherein the metadata is information for describing video contents, and the view data is a total number of users who watch the video. The method also includes obtaining potential view amounts of the plurality of received videos and calculating impact factor scores of the plurality of received videos based on the potential view amounts, each impact factor score including a numerical score for indicating a degree of effectiveness of a corresponding video. Further, the method includes providing a video with a highest impact factor score based on the calculated impact factor scores.

15 Claims, 6 Drawing Sheets

(56) References Cited

U.S. PATENT DOCUMENTS

| | | | | |
|---|---|---|---|---|
| 8,290,341 B2* | 10/2012 | Hirata | | G06F 17/30817 386/248 |
| 8,379,721 B2* | 2/2013 | Wang | | H04N 19/147 375/240.14 |
| 8,924,417 B2* | 12/2014 | Choi | | G06F 17/30787 707/708 |
| 8,970,680 B2* | 3/2015 | Wang | | H04N 5/2226 348/42 |
| 9,122,931 B2* | 9/2015 | Peng | | G06T 11/60 |
| 9,176,987 B1* | 11/2015 | Peng | | G06F 17/30253 |
| 9,201,958 B2* | 12/2015 | Yang | | G06F 17/3079 |
| 9,225,879 B2* | 12/2015 | Kappeler | | H04N 5/144 |
| 9,430,694 B2* | 8/2016 | Iliadis | | G06K 9/00261 |
| 9,430,697 B1* | 8/2016 | Iliadis | | G06K 9/00288 |
| 9,432,703 B2* | 8/2016 | He | | H04N 5/272 |
| 9,509,980 B2* | 11/2016 | Wang | | H04N 5/2226 |
| 9,576,224 B2* | 2/2017 | Iliadis | | G06K 9/6256 |
| 9,600,574 B2* | 3/2017 | Choi | | G06F 17/30787 |
| 9,622,016 B2* | 4/2017 | Wang | | H04W 4/003 |
| 9,639,881 B2* | 5/2017 | Zhu | | G06Q 30/0631 |
| 9,667,980 B2* | 5/2017 | Wang | | H04N 19/147 |
| 9,740,775 B2* | 8/2017 | Wang | | G06F 17/30784 |
| 9,760,806 B1* | 9/2017 | Ning | | G06K 9/66 |
| 2009/0097822 A1* | 4/2009 | Hirata | | G06F 17/30817 386/262 |
| 2016/0323692 A1* | 11/2016 | Wang | | H04W 4/003 |
| 2016/0371598 A1* | 12/2016 | Ding | | G06N 7/005 |
| 2017/0061482 A1* | 3/2017 | Guo | | G06Q 30/0255 |
| 2017/0329566 A1* | 11/2017 | Yuan | | H04N 5/225 |

OTHER PUBLICATIONS

Uploader Intent for Online Video: Typology, Inference, and Applications Christoph Kofler; Subhabrata Bhattacharya; Martha Larson; Tao Chen; Alan Hanjalic; Shih-Fu Chang IEEE Transactions on Multimedia Year: 2015, vol. 17, Issue: 8 pp. 1200-1212 IEEE Journals & Magazines.*

Variable bit rate video traffic prediction based on kernel least mean square method Nasser Haghighat; Hashem Kalbkhani; Mahrokh G. Shayesteh; Mehdi Nouri IET Image Processing Year: 2015, vol. 9, Issue: 9 pp. 777-794 IET Journals & Magazines.*

GPstruct: Bayesian Structured Prediction Using Gaussian Processes Sébastian Bratières; Novi Quadrianto; Zoubin Ghahramani IEEE Transactions on Pattern Analysis and Machine Intelligence Year: 2015, vol. 37, Issue: 7 pp. 1514-1520 IEEE Journals & Magazines.*

Xin Luo "A Class of Generalized Hawkes Processes and Their Applications to Portfolio credit Risk" Nankai University, Apr. 2013.

* cited by examiner

UNIFIED ATTRACTIVENESS PREDICTION FRAMEWORK BASED ON CONTENT IMPACT FACTOR

FIELD OF THE INVENTION

The present invention generally relates to the field of information technology and, more particularly, to a unified attractiveness prediction framework based on a content impact factor.

BACKGROUND

Web Content is the textual, visual or aural content that is encountered as part of user experience on websites. With the bloom of social media, the web content has become increasingly important for all users, retailers, and investors. However, a huge amount of online contents also pose a challenging problem for deciding which one to exploit. There are billions of different types of contents online, and viewers' attentions are extremely asymmetrically distributed. Only a few contents can attract massive attentions. Thus, attractiveness predictions become more important. A potential attractiveness prediction in advance can facilitate retailers in strategy formatting, assist investors in decision making, and help viewers in content selecting.

The attractiveness predictions have been gradually coming into people's sight. Some scholars begin to explore feature oriented methods for making the attractiveness predictions, and some models (e.g., linear regression model and neural network model) are widely used in this area. However, not all the online contents can be handled by the feature oriented methods. For example, online clips have no significant features, namely no celebrated actors/actresses or no famous scripts. Thus, the feature oriented methods are limited when facing various types of online contents.

Recently, some researchers have already noticed the limitation of the feature oriented methods, and two feature free approaches have been proposed. Because a YouTube video's popularity is mostly determined at the early stage of video age, early view pattern data is widely used as a hint for making future predictions. A number of researchers modeled the accrual of early views and/or votes count to predict the long-term dynamics. But the "Early View Pattern Theory" has been challenged. For example, when a researcher explores another social media platform—Renren.com, a Facebook-like online social media network in China, a noticeable lower correlation between the views in early and later times can be found. Network dynamics methods avoid the "Correlation Assumption" and assume there is an explicit network structure, and by simulating the "word-of-mouth" process within the network, it can foresee the potential attractiveness of the content. But, the "explicit network" assumption has presented several challenges in real applications. First, it turns out to be very difficult, if not possible, to obtain a complete network structure. Second, in many scenarios, the network over which the diffusion takes place is in fact implicit or even unknown.

In most cases, the researcher can only observe who watches a video, but could not know from where/whom he/she hears about it. Although the implicit network based methods have been proposed recently, the fixed parameter assumption or the homogenous node assumption undermine these models' ability and flexibility to model the popularity dynamics.

Thus, according to the present disclosure, there are mainly two limitations of recent studies. First, various types of online contents cannot be handled. The web content includes various kinds of entities, such as text, images, sounds, videos, and animations. Most current researches just target at only one type of these entities, such as a video attractiveness prediction or a microblog attractiveness prediction. However, in practice, one might need a combination of various entities, and these systems often do not provide readily usability for such a combination. Second, a rough potential view amount number is meaningless for further use. Most current works just provide a rough potential future view amount number as the indicator for prediction, but such number is incomparable across different platforms because of different user totality. Thus, a more general and comparable indicator is needed.

The disclosed methods and systems are directed to solve one or more problems set forth above and other problems.

BRIEF SUMMARY OF THE DISCLOSURE

One aspect of the present disclosure includes a unified attractiveness prediction method. A unified attractiveness prediction method is provided. The method includes receiving a plurality of videos and extracting at least one of metadata and view data from each of the plurality of received videos, where the metadata is information for describing video contents, and the view data is a total number of users who watch the video. The method also includes obtaining potential view amounts of the plurality of received videos and calculating impact factor scores of the plurality of received videos based on the potential view amounts, each impact factor score including a numerical score for indicating a degree of effectiveness of a corresponding video. Further, the method includes providing a video with a highest impact factor score based on the calculated impact factor scores.

Another aspect of the present disclosure includes a system for making a unified attractiveness prediction. The system includes a bivariate Hawkes processing module configured to extract view data from a plurality of received videos and perform a Hawkes process for the received videos associated with the view data to infer a plurality of parameters based on the extracted view data, where the view data is a total number of users who watch the video. The system also includes a potential view amount calculation module configured to obtain potential view amounts of the plurality of received videos. Further, the system includes an impact factor score calculation module configured to calculate impact factor scores of the plurality of received videos based on the potential view amounts and provide a video with a highest impact factor score based on the calculated impact factor score of each video, where each impact factor score includes a numerical score for indicating a degree of effectiveness of a corresponding video.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
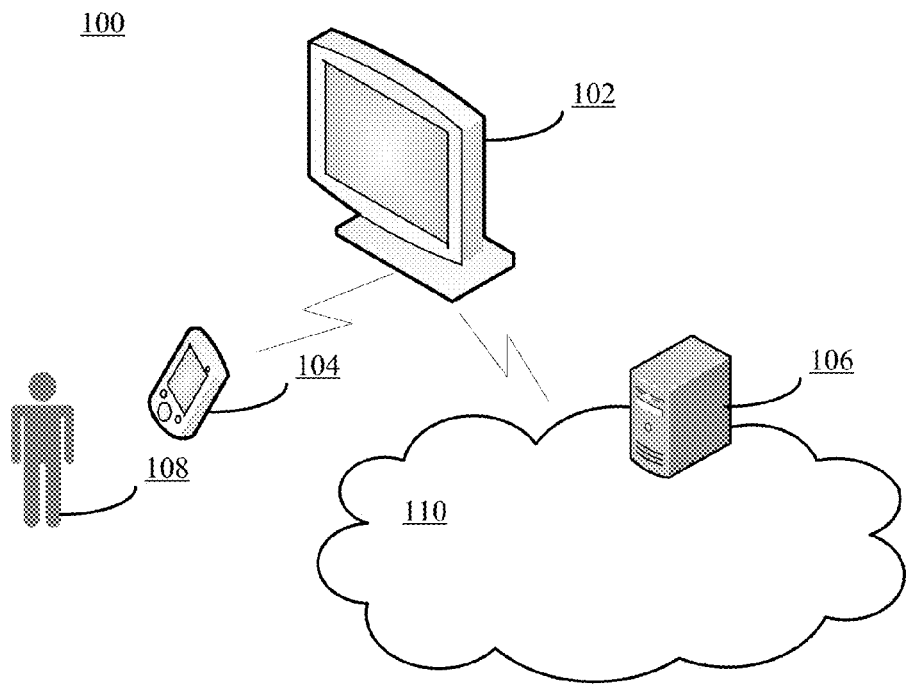
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110. Other devices may also be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc. Although one server 106 is shown in FIG. 1, any number of servers may be included.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
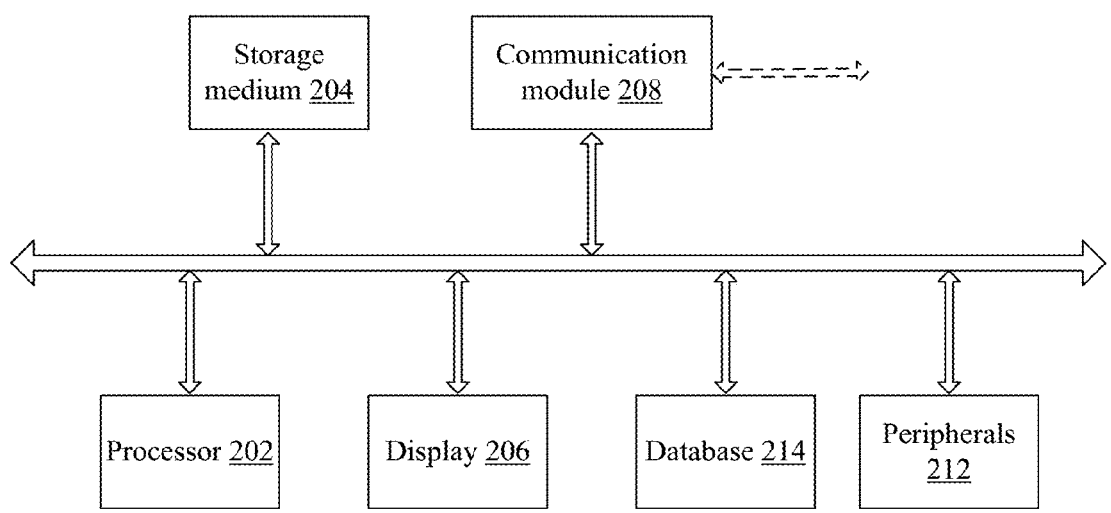
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for performing various processes, when the computer programs are executed by processor 202.

Further, peripherals 212 may include various sensors and other I/O devices, such as a keyboard and a mouse, and communication module 208 may include certain network interface devices for establishing connections through communication networks. Database 210 may include one or more databases for storing certain data and for performing certain operations on the stored data, such as video searching.

In operation, the server 106, the TV 102, and/or the remote control 104 may implement an attractiveness predictor (AttrPredictor) to make a unified attractiveness prediction based on content impact factor scores (CIFS) for the user 108 in commercial and daily life.

Figure 3:
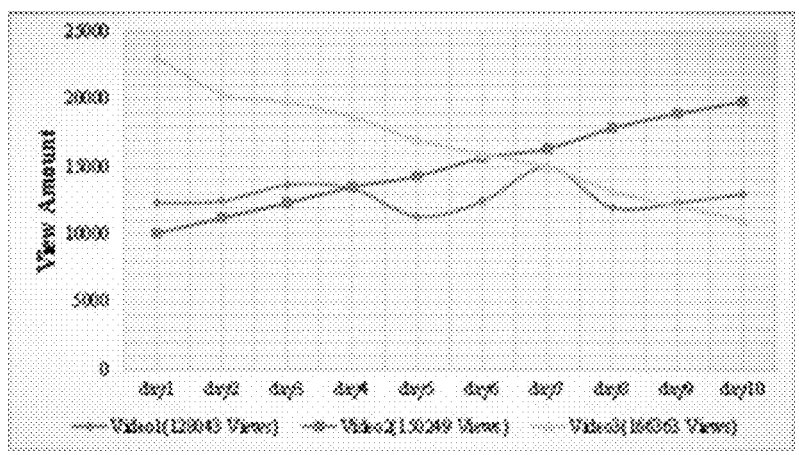
FIG. 3 illustrates view amount change trends of different videos consistent with the disclosed embodiments.

A content impact factor score or CIFS may include various types of information to indicate a popularity or attractiveness of a specific content comparable across different platforms. Comparing to a rough number used by certain systems to indicate the popularity of a content (e.g., a video), the rough number is not sufficient to indicate the video's popularity. FIG. 3 shows view amount change trends of video1, video2, and video3.

As shown in FIG. 3, video3 assembles the most view amount, but it is obvious that this video is fading out. On the contrary, although video2 has a smaller view amount, it is attracting more and more attentions. Thus, it's necessary to build a mechanism to indicate that videos like video2 are more profitable than the ones like video3, as in the CIFS.

Figure 4:
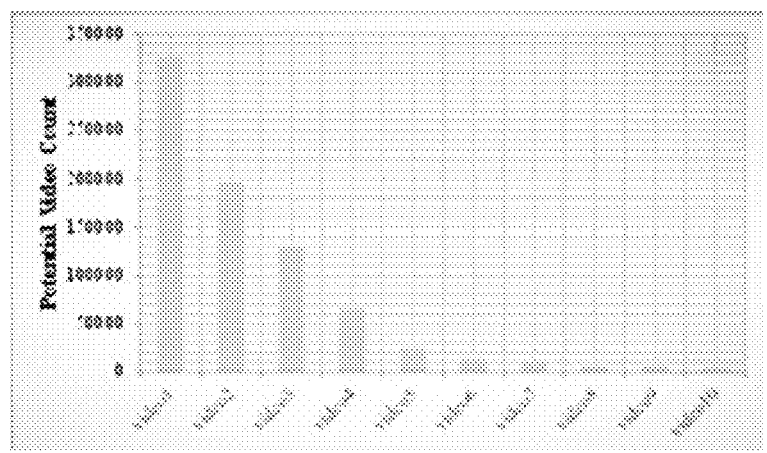
FIG. 4(a) illustrates a domination distribution view pattern.
FIG. 4(b) illustrates an even distribution view pattern.
Figure 4:
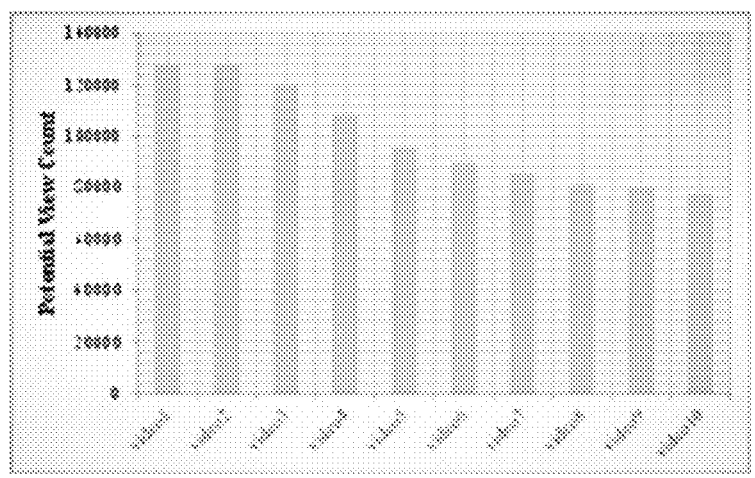

Not using the CIFS, the potential view amount numbers provided by most current methods are not comparable across different platforms. Most current methods just provide a number based on a specific platform (e.g., YouTube or Digg.com), but these numbers are not comparable. However, in many situations, a user wants to get view amount distribution graphs of many different contents from different platforms to facilitate his/her decision making. For example, if the contents' view pattern is as shown in FIG. 4(a) (i.e., a domination distribution view pattern), a user (e.g., a producer) tends to choose to invest only the first content, while if as shown in FIG. 4(b) (i.e., an even distribution view pattern), the user might have to invest all the top 5 videos because it seems hard to tell which one is overwhelming.

Figure 5:
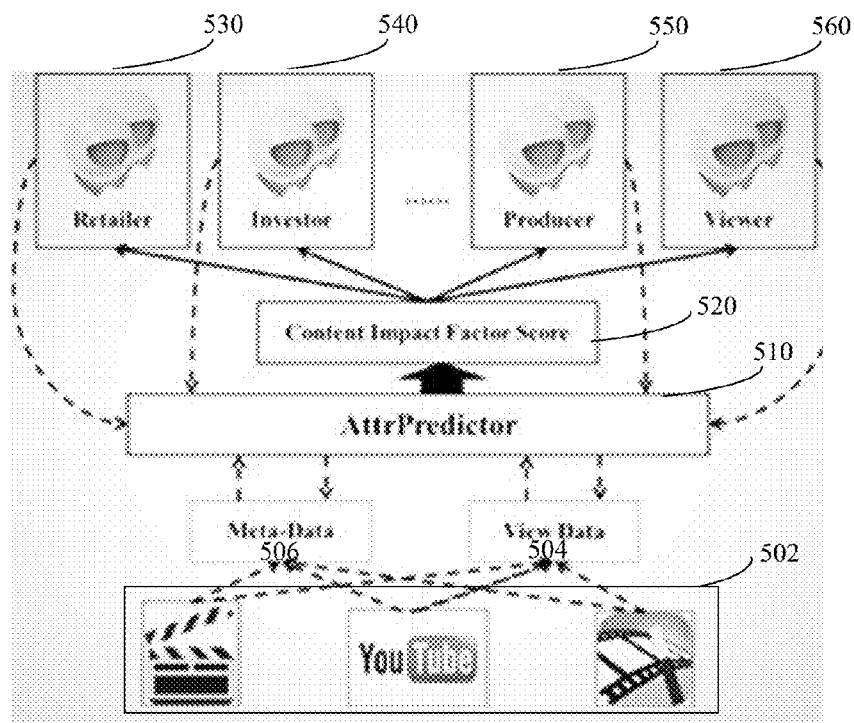
FIG. 5 illustrates a diagram of an exemplary AttrPredictor in online video context consistent with the disclosed embodiments.

For illustrative purposes, online videos are taken as an example to address the mechanism behind AttrPredictor, but it does not mean AttrPredictor is limited to the online videos. FIG. 5 illustrates a diagram of an exemplary AttrPredictor 510 in online video context consistent with the disclosed embodiments.

As shown FIG. 5, the online videos 502 may include movies, online clips, TV series, and so on. In general, the movies have rich metadata 506 (for example, cast list, descriptions, publish date, and so on), but view data 504

(i.e., the number of people who watch a movie in each time episode) of the movies is limited, especially when the movie is not released. While for the online clips, the view data 504 of the online clips is available in most cases, but the metadata 506 of the online clips is always not well organized. Thus, AttrPredictor 510 can accept any of these two kinds of data to provide the CIFS to different parties (e.g., a retailer 530, an investor 540, a producer 550, and a viewer 560) for further use.

Figure 6:
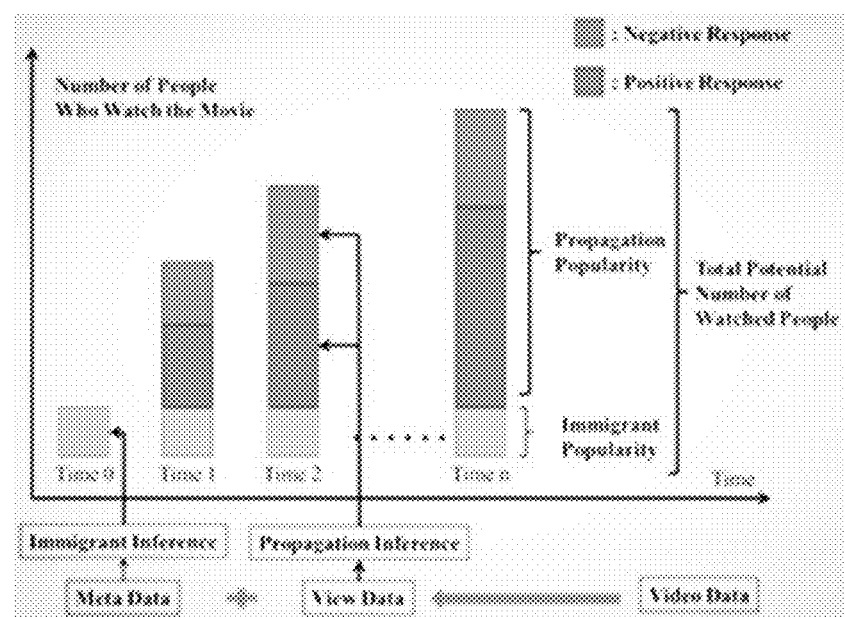
FIG. 6 illustrates a work mechanism of an exemplary AttrPredictor consistent with the disclosed embodiments.

Taking the producer 560 as an example, before a movie is really produced, the producer 560 already has a movie's metadata 506. For example, the producer 560 may know the cast list, the scripts, the specific genre, and so on. The producer 560 can put these features into AttrPredictor 510, and then the CIFS may be obtained. A high CIFS indicates that this movie will be popular and worth producing, otherwise the producer 560 needs to consider certain changes, such as hiring more famous actors/actress or adapting the scripts to retry AttrPredictor 510 until it generates an acceptable CIFS, and then the producer can make the final decision. Similarly, other parties can also benefit from AttrPredictor 510. FIG. 6 shows a work mechanism of AttrPredictor 510.

Figure 7:
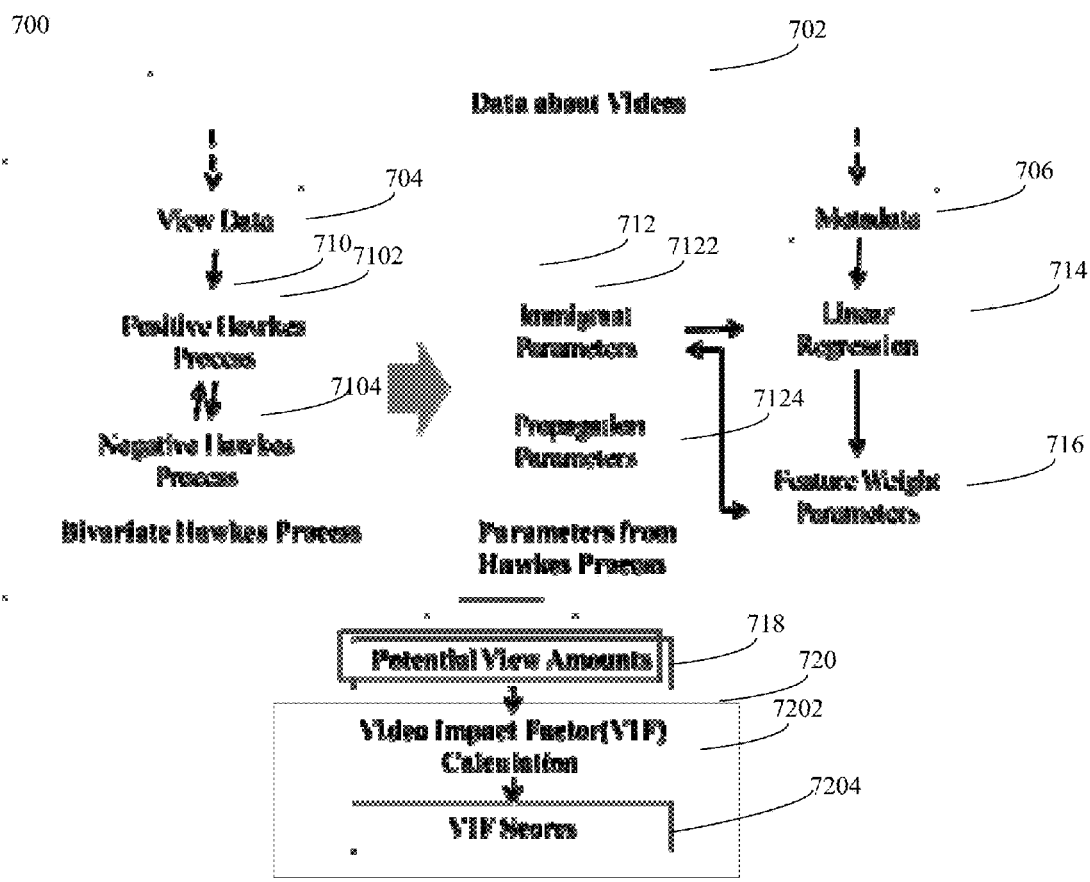
FIG. 7 illustrates an exemplary AttrPredictor system 700 consistent with the disclosed embodiments.

As shown FIG. 6, assuming that there are two kinds of nodes inside the network, including nodes who give positive responses, and nodes who give negative responses, because different sentiments within a network can affect a message's further propagation. These two kinds of nodes interact with each other, and both contribute to the final results. Video data may include metadata and view data. The metadata can affect immigrant population (the number of people who can spontaneously watch the movie), and the view data can reflect propagation population (the number of people who watch a movie by others' recommendation). Finally, a cumulative number of activated nodes can be obtained, and this number can be used as an input of the Content Impact Factor function. A CIFS can be obtained as a hint for future rank or recommendation. FIG. 7 illustrates an exemplary AttrPredictor system 700 consistent with the disclosed embodiments.

As shown in FIG. 7, the AttrPredictor system 700 may include a bivariate Hawkes processing module 710, a parameter inference module 712, a liner regression module 714, a feature weight parameter module 716, a potential view amount calculation module 718, and a video impact factor (VIF) score calculation module 720. Certain components may be omitted and other components may be added. Each of the modules can be processed by one or more computer systems. Further, an input of the AttrPredictor 700 is data about video 702, including view data 704 and metadata 706. The view data 704 may be the number of people who watch a video in each time. The watched video may be a movie, a TV show, etc. For example, when the watched video is a movie, the view data may be the number of people who watch the movie in each time episode. Taking online videos as an example, no matter which type a video belongs to, it should have at least one of these two kinds of data: metadata (data for describing video contents, such as its actors/actresses, scripts, and so on), or view data (a total number of users who watch the video, for example, the number of people who watch this movie in each time episode).

The bivariate Hawkes processing module 710 may be configured to extract view data from a plurality of received videos and perform a Hawkes process for each node including the received view data 704 to infer a plurality of parameters based on the extracted view data. The Hawkes process is a linear self-exciting process. Its conditional intensity process has a particular form which depends upon the previous values of the process itself. The nodes include positive nodes and negative nodes, where each positive node composes a positive Hawkes process 7102, and each negative node composes a negative Hawkes process 7104.

The parameter inference module 712 may be configured to receive immigrant parameters 7122 and propagation parameters 7124 inferred from each Hawkes process. It is assumed that the metadata can affect immigrant population (the number of people who can spontaneously watch the movie), and the view data can reflect propagation population (the number of people who watch a movie by others' recommendation). The metadata can be used to infer the immigrant parameters, and the view data can be used to infer the propagation parameters.

Further, the parameter inference module 712 may infer the parameters in the Hawkes process using a branch structure. If a time dimension is ignored, a Hawkes process is simply a branching process. In other words, the events are related to each other in the way as ancestors and offspring are related to each other. Each node of one tree corresponds to one of the events. The root nodes correspond to immigrants and the branches correspond to the descendants (i.e., offspring) of immigrants. The branching structure representation of Hawkes process is in terms of a cluster Poisson process. That is, the branch structure is used to decompose one Hawkes process into n number of independent Poisson processes. For example, for a "genealogical" tree of a critical branching process, the process starts with one "particle" of zero generation. Each particle produces the Poissonian number of descendants. One Poisson process governs the number of "immigrant" events, and other processes govern the number of "offspring" of each event. Every event of a Hawkes process is either an immigrant or a descendant. One event can either be an immigrant or triggered by one previous event. Consequently, if a user knows which process each event belongs to, the Hawkes process estimation can be reduced to the mixture Poisson process estimation.

The liner regression module 714 may be configured to create a linear regression model by inputting the immigrant parameters as dependent variables and using the features converted from metadata as independent variables. The linear regression model is an approach for modeling the relationship between a scalar dependent variable (i.e., the immigrant parameters) and one or more independent variables (i.e., the features converted from the metadata).

The feature weight parameter module 716 may be configured to learn the feature weight parameters from the linear regression model 714. For learning the feature weight parameters from the linear regression model 714, there are three possible situations: (1) For the videos with the metadata and the view data, the view data can be used directly, and the immigrant parameters 7122 and propagation parameters 7124 can be inferred. Although the prediction can be made for this video, the immigrant parameters 7122 and its metadata feature still need to be used to update the feature weight parameters 716 in the system for future use. (2) For the videos with only metadata (for example, many movies, especially the movies have not been published yet, have no view data), the feature weight parameters 716 can be used directly to generate the immigrant parameters 7122 for the Hawkes processes, and the propagation part can be dismissed. Then, the immigrant parameters 7122 can be used to make a rough prediction for the near future. (3) For the videos with only view data (for example, many online videos have no significant metadata, which means that the videos have no famous actors/actresses or scripts), the bivariate Hawkes processing module 710 can be used directly and the immigrant part is ignored. Then, the rough prediction can also be made.

The potential view amount calculation module 718 may be configured to obtain potential view amounts of the plurality of received videos.

The content impact factor score (CIFS) calculation module 720 may be configured to obtain impact factor scores 7204 by performing the corresponding video impact factor (VIF) calculation 7202 and provide a video with a highest impact factor score based on the calculated impact factor score of each video. Each impact factor score includes a numerical score for indicating a degree of effectiveness of a corresponding video.

A potential view amount of each video can be obtained by the bivariate Hawkes process, but the rough number cannot provide much valuable information for use. Thus, a content impact factor function may be introduced to transfer this rough number into a more meaningful score for future use.

The impact factor (IF) is an important indicator in informatics, and it has been long used to measure a journal's impact. In informatics, the IF can be calculated by:

$$IF_U = \frac{X_{(S,T)}}{Y_{(S,T)}} \quad (1)$$

where X indicates the citation count of a journal; Y indicates the publication count of a journal; S indicates the year before last year; T indicates last year; U indicates this year; and $*_{(S,T)}$ indicates the sum of the count from these two years. Similarly, this concept can be introduced into online content impact measurement.

Assuming that data of the most recent K years can be taken into consideration, and a CIFS can be calculated by:

$$CIFS_t = \frac{\sum_{i=1}^{K} V_{i,t}}{\sum_{i=1}^{V} \max(V_{i,*})} \quad (2)$$

where $V_{i,t}$ indicates the view amount of content t from the $i^{th}$ year, and max $(V_{i,*})$ indicates the maximum view amount from the contents in the $i^{th}$ year. It should be noted that data of the most recent K years may be replaced by data of the most recent K time periods (e.g., data of the most recent K months, data of the most recent K days).

In operation, the AttrPredictor 700 may perform certain processes to calculate the impact factor score of each video, and based on the calculated impact factor score of each video, provide the video that is the most valuable to be considered by many different parties, such as a retailer, a producer, a viewer, and so on. This disclosed AttrPredictor 700 can be applied to various kinds of entities (such as text, images, sounds, videos, and animations) in one unified framework, providing the users with the maximum freedom to predict different kinds of contents within one system.

CIFS offers more insightful meanings than the general view amount number. Also, CIFS can be comparable across platforms, which can be used as an indicator to compare the contents from different websites. Furthermore, CIFS can be used as a guideline for content producers and investors to make business strategies.

Figure 8:
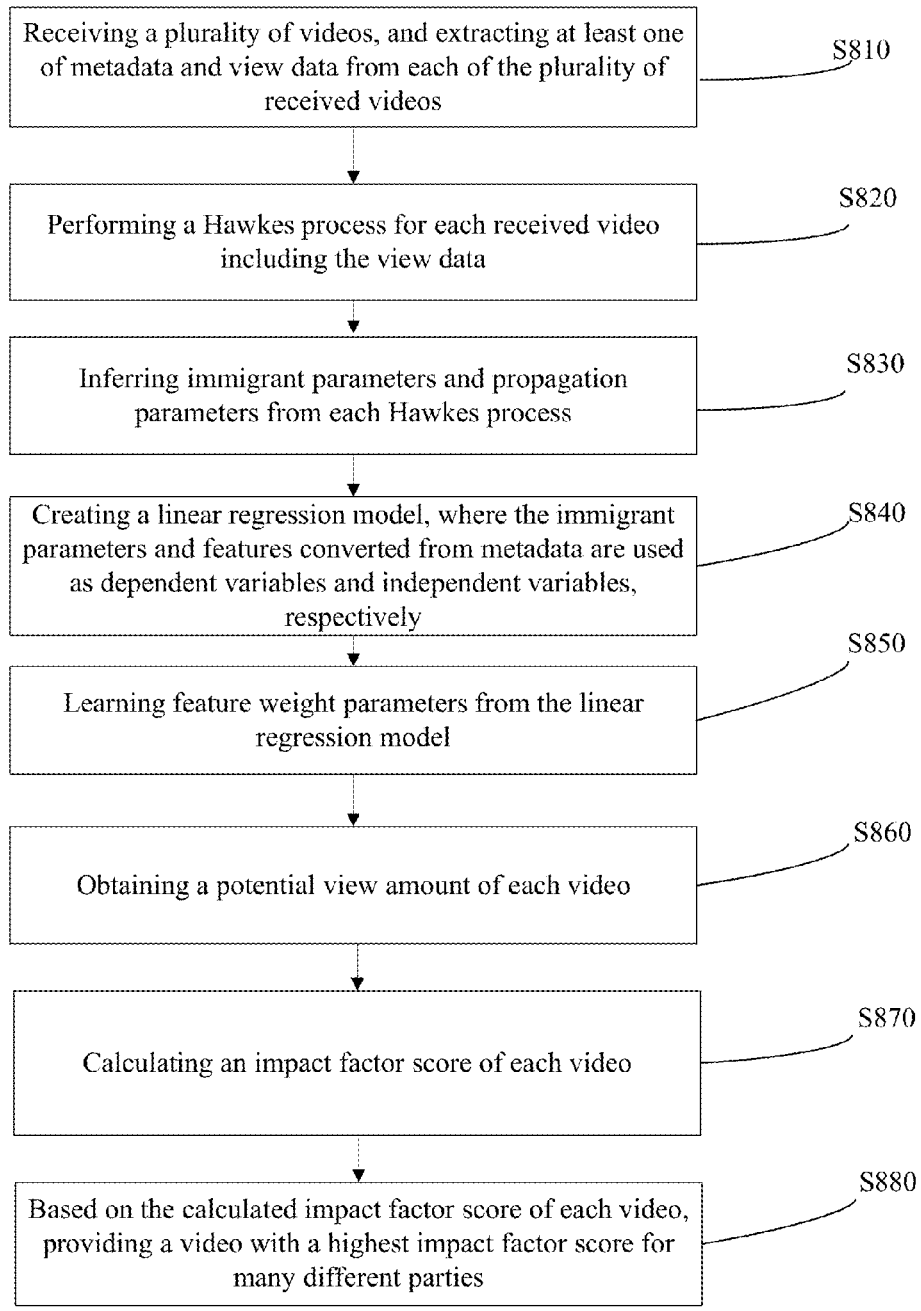
FIG. 8 illustrates a flow chart of an exemplary process of making a unified attractiveness prediction based on a content impact factor consistent with the disclosed embodiments.

FIG. 8 illustrates a flow chart of an exemplary process of making a unified attractiveness prediction based on a content impact factor consistent with the disclosed embodiments. As shown in FIG. 8, at the beginning, a plurality of videos are received, and at least one of metadata and view data is extracted from each of the plurality of received videos (S810). Taking online videos as an example, no matter which type a video belongs to, it should have at least one of these two kinds of data: metadata (data for describing video contents, such as its actors/actresses, scripts, and so on), or view data (a total number of users who watch the video, for example, the number of people who watch this movie in each time episode). It is assumed that the metadata can affect immigrant population (the number of people who can spontaneously watch the movie), and the view data can reflect propagation population (the number of people who watch a movie by others' recommendation).

A Hawkes process is performed for each received video including the view data (S820). A plurality of nodes corresponding to the plurality of received videos may compose the Hawkes processes, where each node has a sentiment tag. The plurality of nodes may include positive nodes and negative nodes, where each positive node composes a positive Hawkes process, and each negative node composes a negative Hawkes process.

The Hawkes process is a mixture of several Poisson processes. The Hawkes process can take both of exogenous and endogenous effect into consideration. A rate function of the Hawkes process can be defined by:

$$\lambda(t) = \mu + \int_0^t \varphi(t-s) dM(s) \quad (3)$$

where $\mu(\mu>0$ is a base rate or an immigrant rate) describes an instantaneous probability with which an individual can choose this video to watch in the absence of the influence of any previous effect from the network; and $\varphi(v)$ is a response function that governs how the process depends on its past.

The Hawkes process requires the following three assumptions:

$$\varphi(v) \geq 0, v \geq 0, \varphi(v) = 0, v < 0, \int_0^\infty \varphi(v) dv \leq 1$$

Together these assumptions imply that $$\varphi(v) = \eta \times f(v, \sigma) \quad (4)$$

where $0 \leq \eta \leq 1$ and $f(v, \sigma)$ is a probability density function with parameter $\sigma$. Under this parameterization, $\eta$ is referred to as the intensity parameter and $f(v, \sigma)$ is the response kernel.

In the case that M is orderly and $dM(\mu)$ is orderly, $\int \varphi(t-s) dM(s)$ can reduce to a sum over all events in [0,t], yielding:

$$\int \varphi(t-s) dM(s) = \sum_{t_j < t} \varphi(t - t_j) \quad (5)$$

Thus, each new time point is associated with a response function describing how that time point affects the future of the process.

Under the assumptions of Hawkes process, each new time point increases the probability of further events occurring in the immediate future (i.e., $\varphi(u)$ is non-negative). The summation shows that the effect of multiple time points on the probability of further events is cumulative. For these reasons, Hawkes process is often referred to as self-exciting; the occurrence of one event increases the probability of further events, whose occurrence in turn increases the probability of even more events. Assuming that there are two Hawkes process functioning, one describes the positive response process, and the other one describes the negative response process. These two Hawkes process affect each other. For each Hawkes process, it can be defined as follows:

$$\lambda_i = \mu_i(t) + \Sigma_{t_{i,k}<t}\varphi_{ii}(t-t_{ik}) + \Sigma_{t_{j,l}<t}\varphi_{ij}(t-t_{jl}) \tag{6}$$

Equation 6 can be explained as following:

(1) i,j∈(1,2), and 1 indicates that this node comes from a positive queue, and 2 indicates that this node comes from a negative queue.

(2) $\mu_i(t)$ is an immigrant function. In most related work, $\mu_i(t)$ is simplified to a stationary value, while a more general case of varying $\mu_i(t)$ can be considered.

(3) $\Sigma_{t_{i,k}<t}\varphi_{ii}(t-t_{ik})$ is a self-exciting function that measures how a previous event in this queue evokes other events happening in the same queue, and $\Sigma_{t_{j,l}<t}\varphi_{ij}(t-t_{jl})$ is a cross-exciting function that measures how events in one queue affect the events in the other queue.

Figure 9:
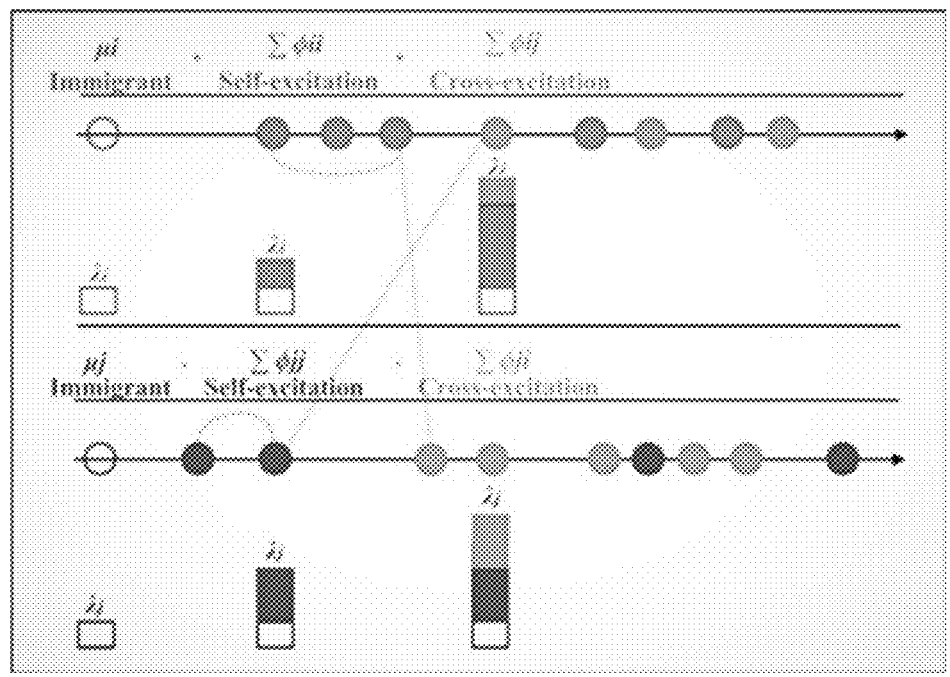
FIG. 9 illustrates a schematic diagram of an exemplary bivariate Hawkes process consistent with the disclosed embodiments.

FIG. 9 illustrates a schematic diagram of an exemplary bivariate Hawkes process consistent with the disclosed embodiments. As shown in FIG. 9, a hollow round represents spontaneous immigrant individual (e.g., $\mu_i$) who chooses to watch a movie without any previous effects from this network; and the solid round (e.g., $\varphi_{ii}$) represents the individuals who have been evoked by other nodes within the network. There are two lines, where the upper one is the positive response process, and the lower one is the negative response process. A positive response node can result from a self-excitation or a cross-excitation. The intensity (rate of events, e.g., $\lambda_i$) of each component is the cumulate value of all the probability of immigrant, self-excitation, and cross-excitation events.

The immigrant Function t can be interpreted as the probability of one person choosing one video according to the own private signal instead of the social impact. For example, if one is Johnny Depp's big fan, she might watch Johnny Depp's every movie immediately after it is published, no matter how others appraise it.

In most related studies, t is assumed to be stationary. However, in a real situation, it is hard to make such a strong assertion. According to the Information Cascading Theory, social impact exerts more and more important impact on individuals' behavior, and thus the importance of private signal can be alleviated according to time. Most big fans can be activated in the very beginning, and with time goes on, more and more people can make their view decisions according to social signals instead of private signals. Thus, it is more reasonable to model μ as a decreasing function than as a constant.

Further, the immigrant function can be modeled as an exponential function, which is expressed as follows:

$$\mu_i(t) = \alpha_i * e^{-\alpha^i t} \tag{7}$$

where $\alpha_i$ is an immigrant parameter, which controls the shape of the immigrant function.

According to the definition of Hawkes process, the response function can be defined as:

$$\varphi(v) = \eta \times f(t-t_i, \sigma) \tag{8}$$

The intense η is a value can be inferred directly, but the response kernel $f(t-t_i, \sigma)$ needs to be chosen carefully. $f(t-t_i, \sigma)$ can be interpreted as the probability that event t responds to event $t_i$, or the influence of event $t_i$ to event t. Commonly, it is believed that $f(t-t_i, \sigma)$ should be a decreasing function, and many researchers tend to choose an Exponential Function or a Power Law function as the response kernel. However, in some real situation, one's influence might not be a monotonically decreasing function, but increasing to a peak, and then dropping, such as the spread of infectious disease. The Rayleigh model is a non-monotonic parametric model previously used in epidemiology. A movie can be well defined as a kind of "disease" that spread among a network. Thus, in this work, Rayleigh Distribution can be used as the response model. The Rayleigh Distribution can be defined as follows:

$$f(x) = \frac{x}{\sigma^2} e^{-\frac{x^2}{2\sigma^2}} \tag{9}$$

Figure 10:
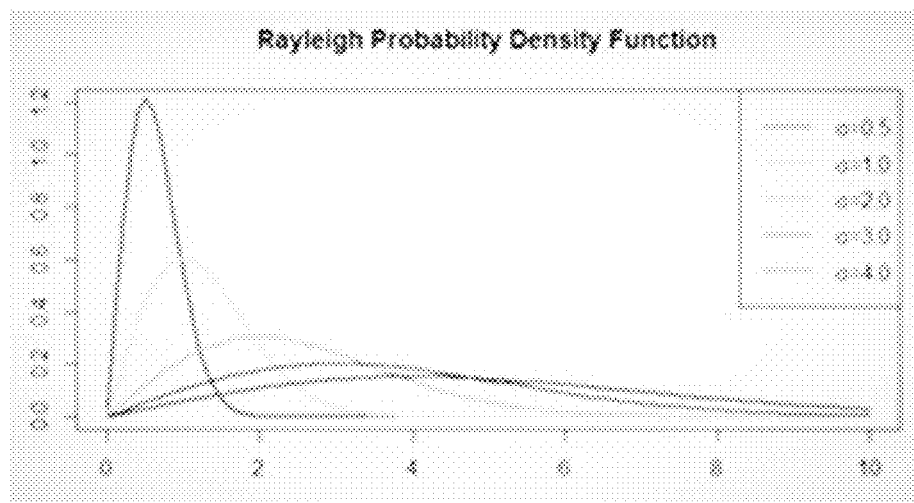
FIG. 10 illustrates a brief view of Rayleigh Distribution's probability density function.

FIG. 10 shows a brief view of Rayleigh Distribution's probability density function. As shown in FIG. 10, the value of Rayleigh Distribution's probability density function can be computed at each of the values in X using the corresponding scale parameter σ. σ can be 0.5, 1, 2, 3, and 4 for the lines from top to bottom, respectively. A scalar input for X or σ can be expanded to a constant array with the same dimensions as the other input.

Specifically, the response kernel can be defined as:

$$\phi_{ij}(t-t_k; \sigma_{ij}) = \eta_{ij} \times \left( \sum_{t_k<t} \frac{x}{\sigma_{ij}} e^{-\frac{x^2}{2\sigma_{ij}^2}} \right) \tag{10}$$

Further, a complete intensity rate function for one Hawkes process can be defined as:

$$\lambda_i(t) = \alpha_i e^{-\alpha^i t} + \sum_{t_{i,k}<t} \eta_{ii} * \frac{(t-t_{i,k})}{\sigma_{ii}^2} e^{-\frac{(t-t_{i,k})^2}{2\sigma_{ii}^2}} + \sum_{t_{j,l}<t} \eta_{ij} * \frac{(t-t_{j,l})}{\sigma_{ij}^2} e^{-\frac{(t-t_{j,l})^2}{2\sigma_{ij}^2}} \tag{11}$$

Totally, 10 parameters (that is, $\alpha_i$, $\alpha_j$, $\eta_{ii}$, $\eta_{ij}$, $\eta_{ij}$, $\eta_{ji}$, $\sigma_{ii}$, $\sigma_{ij}$, $\sigma_{ji}$, $\sigma_{jj}$) need to be optimized. Expectation-Maximization (EM) is a technique used in point estimation. EM may be performed to make parameter inferring and optimization.

Returning to FIG. 8, after performing S820, immigrant parameters and propagation parameters can be inferred from each Hawkes process (S830). The metadata can be used to infer the immigrant parameters, and the view data can be used to infer the propagation parameters.

The Hawkes process can be defined in two equivalent methods: either using a conditional intensity function or as a Poisson cluster process with a certain branch structure. For a long run, a conditional intensity function is used, because the conditional intensity function can immediately lead to an expression for the likelihood and make numerical procedures for maximizing the function. However, such approximation maximum likelihood estimation can be numerically unstable. Thus, a branch structure method has been proposed as an alternative maximum likelihood estimation to infer the parameters in the Hawkes process.

If a time dimension is ignored, a Hawkes process is simply a branching process. In other words, the events are related to each other in the way as ancestors and offspring are related to each other. Each node of one tree corresponds to one of the events. The root nodes correspond to immigrants and the branches correspond to the descendants (i.e., offspring) of immigrants. The branching structure representation of Hawkes process is in terms of a cluster Poisson process. The branch structure is used to decompose one Hawkes process into n number of independent Poisson processes. One Poisson process governs the number of "immigrant" events, and other processes govern the number of "offspring" of each event. One event can either be an immigrant or triggered by one other previous event. Consequently, if which process each event belongs to is known, the Hawkes process estimation would be reduced to the mixture Poisson process estimation.

Thus, if a missing variable that describes the specific process is introduced to which event $t_k$ belongs to, EM can be performed to make such an inference. Given a set of observable variables X and unknown (latent) variables Z, parameters $\theta$ can be estimated in a model. Further, $Z_i = (Z_{i,0,0}, Z_{i,i,1}, \ldots, Z_{i,i,N_i}, Z_{i,j,1}, Z_{i,j,2} \ldots, Z_{i,j,N_j})$ denotes the missing data, namely the branch structure. $Z_{i,j,l}=1$ indicates that this event is happening in the $i^{th}$ queue, and it is evoked by the $l^{th}$ event in the $j^{th}$ queue, and $Z_{i,0,0}=1$ indicates that this is an immigrant event in the $i^{th}$ queue.

The posterior probability of Z can be obtained from a Bayes' rule. The posterior probability of the $k^{th}$ event in the $i^{th}$ process that is evoked by the $l^{th}$ event in the $j^{th}$ process can be calculated as follows:

$$Prob(Z_{i,j,l} = 1 | X, \theta) = \frac{\lambda_{z_{j,l}}(t_{i,k})}{\sum_{m \in z} \lambda_m(t_{i,k})} \quad (12)$$

Equation 12 is the E-step in an EM algorithm.

According to the point process definition, the general form of the log-likelihood for a point process is defined by:

$$l(\theta | X) = \sigma_k \ln(\lambda(t_k)) - \int_0^T \lambda(s) ds \quad (13)$$

where [0,T] is the observation period; $X=(t_1, t_2, \ldots t_N)$ denotes the observed event time; $\theta$ denotes the parameter collection of this model; and the integral of $\lambda(t)$ over the interval $[0,\mu]$ is referred as $\Lambda(\mu)$.

The log-likelihood of a multivariate point process can be treated through a sum of univariate margins, represented as $l = \Sigma_i l_i$. Thus, one Hawkes process's complete log-likelihood can be represented as:

$$l_i(\theta_i | X_i, Z_i) = \Sigma_{z \in z_i} (\Sigma_{k=1}^{N_i} \ln(\lambda_z(t_{i,k})) * \delta(Z_{i,k}=z) - \Lambda(T)) \quad (14)$$

and its expectation can be written as:

$$Q_i(\theta) = E_{Z_i | X_i, \theta_i} l_i(\theta_i | X_i, Z_i) = \Sigma_{z \in z_i} (\Sigma_{k=1}^{N_i} \ln(\lambda_z(t_{i,k})) * Prob(Z_{i,k}=z | X_i, \theta_i) - \Lambda_z(T))) \quad (15)$$

Equation 15 is the M-step in the EM algorithm, and it can be detailed in the following form:

$$Q_i(\theta) = \Sigma_{z \neq z_i} \Sigma_{n=1}^{N_i} (\ln(\mu_i(t)) * Prob(Z_{i,0,0}=1) + \Sigma_{t_{j,l} < t_n} \ln(\eta_{ii} * f(t_n - t_{i,k}; \sigma_{ii})) * Prob(Z_{i,k,n}=1) + \Sigma_{t_{j,l} < t_n} \ln(\eta_{ij} * f(t_n - t_{j,l}; \sigma_{ij})) * Prob(Z_{j,l,n}=1) - (\Sigma_{n=1}^{N_i} U_i(T-t_n) + \eta_{ii} * \Sigma_{n=1}^{N_i} F_{ii}(T-t_n) + \eta_{ij} * \Sigma_{n=1}^{N} F_{ij}(T-t_n)) \quad (16)$$

where $$U_i(T-t_n) = \int_{t_n}^T \mu(v-t_n) dv \approx 1 \quad (17)$$

$$F_{ii}(T-t_n) = \int_{t_n}^T f_{ii}(v-t_n) dv \approx 1 \quad (18)$$

$$F_{ii}(T-t_n) = \int_{t_n}^T f_{ii}(v-t_n) dv \approx 1 \quad (19)$$

$U_i(T-t_n)$, $F_{ii}(T-t_n)$, $F_{ii}(T-t_n)$ can be simply taken as 1 by assuming the whole process is stationary, so the whole process can be simple written as follows:

$$Q_i(\theta) = \Sigma_{z \neq z_i} \Sigma_{n=1}^{N_i} (\ln(\mu_i(t)) * Prob(Z_{i,0,0}=1) + \Sigma_{t_{j,l} < t_n} \ln(\eta_{ii} * f(t_n - t_{i,k}; \sigma_{ii})) * Prob(Z_{i,k,n}=1) + \Sigma_{t_{j,l} < t_n} \ln(\eta_{ij} * f(t_n - t_{j,l}; \sigma_{ij})) * Prob(Z_{j,l,n}=1)) - (N_i + \eta_{ii} * N_i + \eta_{ij} * N_i) \quad (20)$$

Then, each parameter's value can be obtained by making a derivation on the above formula, and each parameter can be calculated as follows:

Optimizing $\alpha$:

$$\frac{\partial}{\partial \alpha_i} Q_i(\theta) = \frac{\partial}{\partial \alpha_i} \left( \sum_{n=1}^{N_i} \ln(\alpha_i * e^{-\alpha_i * t_n}) * Prob(Z_{i,0,0} = 1) \right) = 0 \quad (21)$$

$$\alpha_i = \frac{\sum_{n=1}^{N_i} Prob(Z_{i,0,0} = 1)}{\sum_{n=1}^{N_i} Prob(Z_{i,0,0} = 1) * t_n} \quad (22)$$

Optimizing $\eta$:

$\eta_{ij}$ is used as an example to show how to infer $\eta$, the derivation of other $\eta$s are similar.

$$\frac{\partial}{\partial \eta_{ij}} Q_i(\theta) = \quad (23)$$

$$\frac{\partial}{\partial \eta_{ij}} \left( \sum_{n=1}^{N_i} \sum_{t_{j,l} < t_n} (\ln(\eta_{ij})) * Prob(Z_{i,k,n} = 1) - \eta_{i,j} * N_i \right) = 0$$

$$\eta_{ij} = \frac{\sum_{n=1}^{N_i} \sum_{t_{j,l} < t_n} Prob(Z_{i,j,l} = 1)}{N_i} \quad (24)$$

Optimizing $\sigma$:

$\sigma_{ij}$ is used as an example to show how to infer $\sigma$, and the derivation of other $\sigma$s are similar.

$$\frac{\partial}{\partial \sigma_{ij}} Q_i(\theta) = \frac{\partial}{\partial \sigma_{ij}} \left( \sum_{n=1}^{N_i} \sum_{t_{j,l} < t_n} \left( -2 \ln(\sigma_{i,j}) - \frac{(t_n - t_{j,l})^2}{2 \sigma_{ij}^2} \right) \right) = 0 \quad (25)$$

$$\sigma_{ij} = \sqrt{\frac{\sum_{n=1}^{N_i} \sum_{t_{j,l} < t_n} (t_{j,l} - t_n)^2}{2 \left( \sum_{n=1}^{N} \sum_{t_{j,l} < t_n} Prob(Z_{i,j,l} = 1) \right)}} \quad (26)$$

After the immigrant parameters are obtained, a linear regression model is created, where the immigrant parameters and features converted from the metadata are used as dependent variables and independent variables, respectively (S840). The linear regression model is an approach for modeling the relationship between a scalar dependent variable (i.e., the immigrant parameters) and one or more independent variables (i.e., the features converted from the metadata). Then, feature weight parameters can be learned from the linear regression model (S850). There are three possible situations: (1) For the videos with the metadata and the view data, the view data can be used directly by performing a bivariate Hawkes process, and the immigrant parameters and propagation parameters can be inferred. Although the prediction can be made for this video, the immigrant parameters and its metadata feature still need to be used to update the feature weight parameters in the system for future use. (2) For the videos with only metadata (for example, many movies, especially the movies have not been published yet, have no view data), the feature weight parameters can be used directly to generate the immigrant parameters for the Hawkes processes, and the propagation part can be dismissed. Then, the immigrant parameters can be used to make a rough prediction for the near future. (3) For the videos with only view data (for example, many online videos have no significant metadata, which means have no famous actors/actresses or scripts), the Hawkes process can be performed directly and the immigrant part is ignored. Then, the rough prediction can also be made.

Further, a potential view amount of each video is obtained (S860).

The metadata can affect immigrant population (the number of people who can spontaneously watch the movie), and the view data can reflect propagation population (the number of people who watch a movie by others' recommendation). After performing the bivariate Hawkes process, the potential view amount of each video can be obtained by a sum of the immigrant population and the propagation population, but the rough number cannot provide much valuable information for use. Thus, a content impact factor function may be introduced to transfer this rough number into a more meaningful score for future use. Based on the potential view amount of each video, the impact factor score of each video can be calculated (S870). Each impact factor score includes a numerical score for indicating a degree of effectiveness of a corresponding video.

The impact factor (IF) is an important indicator in informatics, and it has been long used to measure a journal's impact. In informatics, the IF can be calculated by:

$$IF_U = \frac{X_{(S,T)}}{Y_{(S,T)}} \quad (1)$$

where X indicates the citation count of a journal; Y indicates the publication count of a journal; S indicates the year before last year; T indicates last year; U indicates this year; and $*_{(S,T)}$ indicates the sum of the count from these two years. Similarly, this concept can be introduced into online content impact measurement.

Assuming that the most recent K years data can be taken into consideration, as previously described, a content impact factor score (CIFS) can be calculated by:

$$CIFS_t = \frac{\sum_{i=1}^{K} V_{i,t}}{\sum_{i=1}^{K} \max(V_{i,*})} \quad (2)$$

where $V_{i,t}$ indicates the view amount of content t from the $i^{th}$ year, and max $(V_{i,*})$ indicates the maximum view amount from the contents in the $i^{th}$ year.

Taking video impact factor (VIF) as an example, when the 3 videos can be calculated from Equation 2, and set K=3, $VIF_{video}1=0.66$, $VIF_{video}2=1.0$, and $VIF_{video}3=0.64$ can be obtained. From this view, video2 is the most valuable to consider; video1 is the second most valuable to consider; and video3 is the last one even though it has the largest cumulative view amount. That is, although video2 has a smaller view amount, it is attracting more and more attention.

Finally, based on the calculated impact factor score of each video, a video with a highest impact factor score (i.e., the video that is the most valuable to be considered) may be provided for many different parties, such as a retailer, a producer, a viewer, and so on (S880).

The disclosed systems and methods can also be applied as a core function for other systems, such as social media systems, other content recommendation systems, information retrieval systems, or any user interactive systems, and so on. For example, a decision support system can be used for helping a retailer in advertisement selecting for product promotion. The advertisement may be a video that can be watched on the website, for example, and can be an advertising video. That is, the retailer can select one of a list of candidate advertisements for use in the near future (e.g., an advertisement on TV or on the Internet for holiday season) by using the decision support system. At the beginning, a Hawkes process is performed for each advertisement including the view data (the number of people who watch the advertisement) to infer immigrant parameters and propagation parameters. Then, a linear regression model of the advertisements is created, where the immigrant parameters and features converted from the metadata (e.g., scripts for the advertisement) are used as dependent variables and independent variables, respectively. Next, feature weight parameters are learned from the created linear regression model of the advertisements. Potential view amounts of the advertisements are obtained by performing the bivariate Hawkes process. Further, an impact factor score of each advertisement is calculated. Finally, based on the calculated impact factor score of each advertisement, an advertisement with a highest impact factor score is recommended for the retailer.

The disclosed methods and systems can be applied to various kinds of online content, from tweets to online clips. In addition, the disclosed system may generate a CIFS for future use. The CIFS can provide more meaningful information for wider range of applications. Thus, the disclosed system presents as a general platform that can provide useful information for many different parties (such as a retailer, a producer, a viewer, and so on), which helps them to customize the site and overall experience for subscribers, to retain subscribers through personalized interactions, to target advertising and product recommendations, etc.

Other steps may be referred to above descriptions with respect to the system for making a unified attractiveness prediction. Other applications, advantages, alternations, modifications, or equivalents to the disclosed embodiments are obvious to those skilled in the art.

What is claimed is:
1. A unified attractiveness prediction method, comprising:
receiving a plurality of videos;
extracting at least one of metadata and view data from each of the plurality of received videos, wherein the metadata is information for describing video contents, and the view data is a total number of users who watch the video;
based on the extracted view data, performing a Hawkes process for the received videos associated with the view data to infer a plurality of parameters of the received videos;
based on the plurality of obtained parameters and features converted from the extracted metadata, creating a linear regression model and learning feature weight parameters from the created linear regression model;
obtaining potential view amounts of the plurality of received videos;
based on the potential view amounts, calculating impact factor scores of the plurality of received videos, each impact factor score including a numerical score for indicating a degree of effectiveness of a corresponding video; and based on the calculated impact factor scores, providing a video with a highest impact factor score.

2. The method according to claim 1, wherein:

the plurality of obtained parameters include immigrant parameters and propagation parameters, wherein the immigrant parameters govern a total number of users who spontaneously watch the video, and the propagation parameters govern a total number of users who watch the video by others' recommendation.

3. The method according to claim 1, wherein creating a linear regression model of the received videos further includes:

using the obtained immigrant parameters as dependent variables of the linear regression model; and using the features converted from the metadata as independent variables of the linear regression model.

4. The method according to claim 1, wherein:

a plurality of nodes, including positive nodes and negative nodes, corresponding to the plurality of received videos compose the Hawkes processes, wherein each of the positive nodes composes a positive Hawkes process, and each of the negative nodes composes a negative Hawkes process.

5. The method according to claim 2, further including:

when the videos include the metadata and the view data, performing the Hawkes process by using directly the view data to infer the immigrant parameters and the propagation parameters;

when the videos only include the metadata, generating the immigrant parameters by using directly the feature weight parameters for the Hawkes processes, and ignoring the propagation part, such that the immigrant parameters are used to make a rough prediction for near future; and when the videos only include the view data, performing the Hawkes process directly and ignoring the immigrant part to make the rough prediction.

6. The method according to claim 5, wherein:

a rate function of the Hawkes process is defined by:

$$\lambda_i = \mu_i(t) + \Sigma_{t_{ik}<t}\varphi_{ii}(t-t_{ik}) + \Sigma_{t_{jl}<t}\varphi_{ij}(t-t_{jl})$$

wherein i,j∈(1,2), and 1 indicates that the node comes from a positive queue, and 2 indicates that the node comes from a negative queue; t is a time point; $\mu_i(t)$ is an immigrant function; $\Sigma_{t_{ik}<t}\varphi_{ii}(t-t_{ik})$ is a self-exciting function that measures how a previous event in the queue evokes other events happening in a same queue; and $\Sigma_{t_{jl}<t}\varphi_{ij}(t-t_{jl})$ is a cross-exciting function that measures how events in one queue affect events in the other queue.

7. The method according to claim 1, wherein:

provided that the most recent K time periods data is taken into consideration, a content impact factor score (CIFS) is calculated by:

$$CIFS_t = \frac{\sum_{i=1}^{K} V_{i,t}}{\sum_{i=1}^{K} \max(V_{i,*})}$$

wherein $V_{i,t}$ indicates a view amount of content t from the $i^{th}$ time period, and $\max(V_{i,*})$ indicates a maximum view amount from the contents in the $i^{th}$ time period.

8. A system for making a unified attractiveness prediction, comprising:

a processor;

a memory coupled to the processor;

a plurality of program modules stored in the memory to be executed by the processor, the plurality of program modules comprising:

a bivariate Hawkes processing module configured to:

extract view data from a plurality of received videos, wherein the view data is a total number of users who watch the video; and based on the extracted view data, perform a Hawkes process for the received videos associated with the view data to infer a plurality of parameters of the received videos;

a potential view amount calculation module configured to obtain potential view amounts of the plurality of received videos; and an impact factor score calculation module configured to calculate impact factor scores of the plurality of received videos based on the potential view amounts and provide a video with a highest impact factor score based on the calculated impact factor score of each video, wherein each impact factor score includes a numerical score for indicating a degree of effectiveness of a corresponding video.

9. The system according to claim 8, further including:

a parameter inference module configured to receive the plurality of parameters inferred from the Hawkes process;

a liner regression module configured to create a linear regression model based on the plurality of obtained parameters and features converted from metadata of the received videos, wherein the metadata is information for describing video contents; and a feature weight parameter module configured to learn feature weight parameters from the created linear regression model.

10. The system according to claim 9, wherein:

the plurality of obtained parameters include immigrant parameters and propagation parameters, wherein the immigrant parameters govern a total number of users who spontaneously watch the video, and the propagation parameters govern a total number of users who watch the video by others' recommendation.

11. The system according to claim 9, wherein the liner regression module is further configured to:

use the obtained immigrant parameters as dependent variables of the linear regression model; and use the features converted from the metadata extracted from the plurality of received videos as independent variables of the linear regression model.

12. The system according to claim 8, wherein:

a plurality of nodes, including positive nodes and negative nodes, corresponding to the plurality of received videos compose the Hawkes processes, wherein each of the positive nodes composes a positive Hawkes process, and each of the negative nodes composes a negative Hawkes process.

13. The system according to claim 9, wherein:

when the videos include the metadata and the view data, the Hawkes process is performed by using directly the view data to infer the immigrant parameters and the propagation parameters;

when the videos only include the metadata, the immigrant parameters is generated by using directly the feature weight parameters for the Hawkes processes, and the propagation part is ignored, such that the immigrant parameters are used to make a rough prediction for near future; and when the videos only include the view data, the Hawkes process is performed directly, and the immigrant part is ignored, making the rough prediction.

14. The system according to claim 13, wherein:
a rate function of the Hawkes process is defined by:

$$\lambda_i = \mu_i(t) + \Sigma_{t_{i,k}<t}\varphi_{ii}(t-t_{ik}) + \Sigma_{t_{jl}<t}\varphi_{ij}(t-t_{jl})$$

wherein i,j∈(1,2), and 1 indicates that this node comes from a positive queue, and 2 indicates that this node comes from a negative queue; t is a time point; $\mu_i(t)$ is an immigrant function; $\Sigma_{t_{i,k}<t}\varphi_{ii}(t-t_{ik})$ is a self-exciting function that measures how a previous event in the queue evokes other events happening in a same queue; and $\Sigma_{t_{jl}<t}\varphi_{ij}(t-t_{jl})$ is a cross-exciting function that measures how events in one queue affect events in the other queue.

15. The system according to claim 8, wherein:
provided that the most recent K time periods data is taken into consideration, a content impact factor score (CIFS) is calculated by:

$$CIFS_t = \frac{\sum_{i=1}^{K} V_{i,t}}{\sum_{i=1}^{K} \max(V_{i,*})}$$

wherein $V_{i,t}$ indicates a view amount of content t from the $i^{th}$ time period, and $\max(V_{i,*})$ indicates a maximum view amount from the contents in the $i^{th}$ time period.

* * * * *